United States Patent
Murphy

(10) Patent No.: US 11,669,466 B2
(45) Date of Patent: Jun. 6, 2023

(54) MEMORY MODULE DATA OBJECT PROCESSING SYSTEMS AND METHODS

(71) Applicant: Micron Technology, Inc., Boise, ID (US)

(72) Inventor: Richard C. Murphy, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/733,320

(22) Filed: Apr. 29, 2022

(65) Prior Publication Data
US 2022/0261359 A1 Aug. 18, 2022

Related U.S. Application Data

(62) Division of application No. 17/085,353, filed on Oct. 30, 2020, now Pat. No. 11,334,500, which is a (Continued)

(51) Int. Cl.
*G06F 12/14* (2006.01)
*G06F 12/0813* (2016.01)
*G06F 9/455* (2018.01)

(52) U.S. Cl.
CPC ...... *G06F 12/1433* (2013.01); *G06F 9/45558* (2013.01); *G06F 12/0813* (2013.01);
(Continued)

(58) Field of Classification Search
CPC ............. G06F 12/1433; G06F 9/45558; G06F 12/0813; G06F 2009/45583;
(Continued)

(56) References Cited

U.S. PATENT DOCUMENTS 7,228,299 B1 * 6/2007 Harmer ................. G06F 16/148
707/999.102
9,880,750 B1 1/2018 Ravindran et al.
(Continued)

OTHER PUBLICATIONS

PCT International Search Report for PCT Application No. PCT/US2019/014036 dated May 1, 2019; 16 Pages.

*Primary Examiner* — David Yi
*Assistant Examiner* — Zubair Ahmed
(74) *Attorney, Agent, or Firm* — Fletcher Yoder, P.C.

(57) ABSTRACT

The present disclosure provides methods, apparatus, and systems for implementing and operating a memory module, for example, in a computing that includes a network interface, which may be coupled to a network to enable communication with a client device, and host processing circuitry, which may be coupled to the network interface via a system bus and programmed to perform first data processing operations based on user inputs received from the client device. The memory module may be coupled to the system bus and include memory devices and a memory controller coupled to the memory devices via an internal bus. The memory controller may include memory processing circuitry programmed to perform a second data processing operation that facilitates performance of the first data processing operations by the host processing circuitry based on context of the data block indicated by the metadata.

20 Claims, 3 Drawing Sheets

Related U.S. Application Data division of application No. 16/050,501, filed on Jul. 31, 2018, now Pat. No. 10,838,876, which is a division of application No. 15/908,184, filed on Feb. 28, 2018, now Pat. No. 10,754,793.

(52) U.S. Cl.
CPC .............. *G06F 2009/45583* (2013.01); *G06F 2009/45595* (2013.01)

(58) Field of Classification Search
CPC ....... G06F 2009/45595; G06F 11/1004; G06F 9/5027; G06F 11/1666; G06F 15/7821; G06F 2009/45579; G06F 2209/509; G06F 13/1668; G06F 11/1008; G06F 12/1408; G06F 13/20
USPC .................................................. 711/204, 203
See application file for complete search history.

(56) References Cited

U.S. PATENT DOCUMENTS

| | | |
|---|---|---|
| 10,013,267 B1 | 7/2018 | Wagner et al. |
| 2003/0012062 A1 | 1/2003 | Ironi et al. |
| 2013/0262538 A1 | 10/2013 | Wegener |
| 2014/0176187 A1* | 6/2014 | Jayasena .............. G11C 7/1006 326/39 |
| 2014/0279909 A1 | 9/2014 | Sudarsanam |
| 2014/0301393 A1 | 10/2014 | Von Boehn et al. |
| 2014/0359219 A1 | 12/2014 | Evans et al. |
| 2016/0188413 A1 | 6/2016 | Abali |
| 2016/0253125 A1 | 9/2016 | Bennett et al. |
| 2019/0238833 A1* | 8/2019 | Jun ..................... G06F 13/1668 |

* cited by examiner

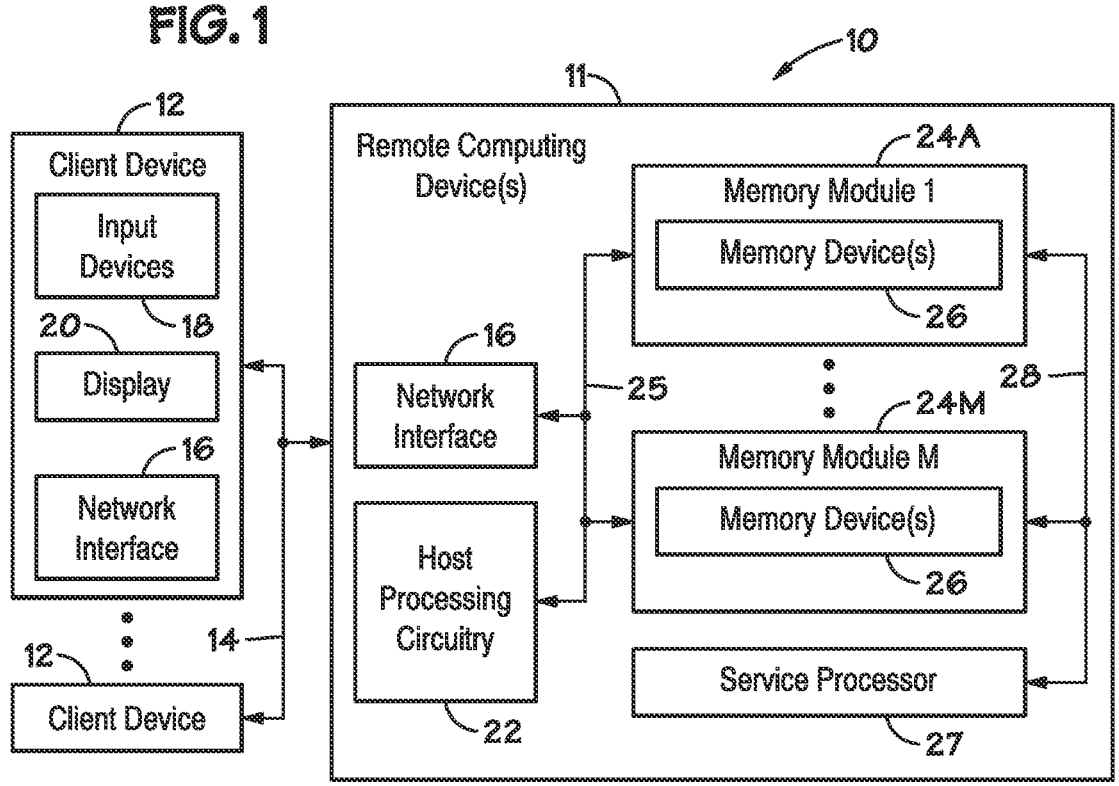
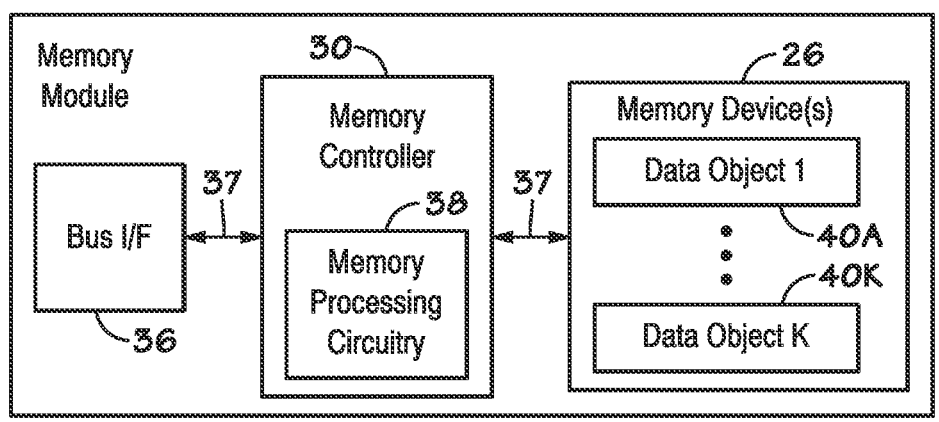

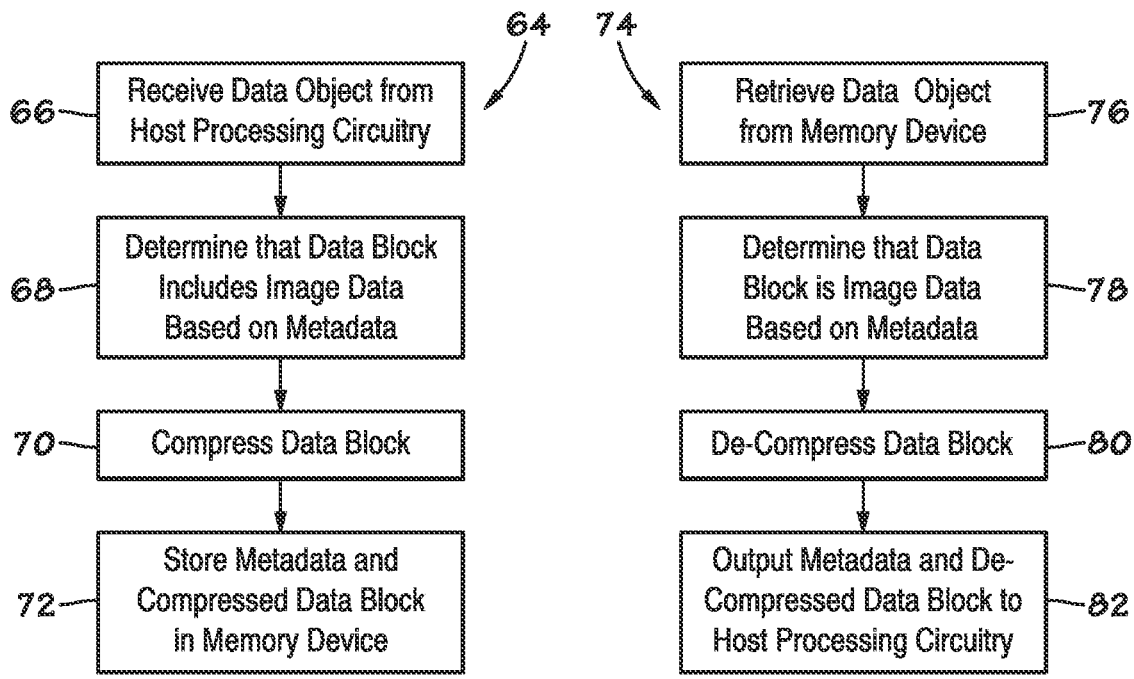
FIG. 6
FIG. 7
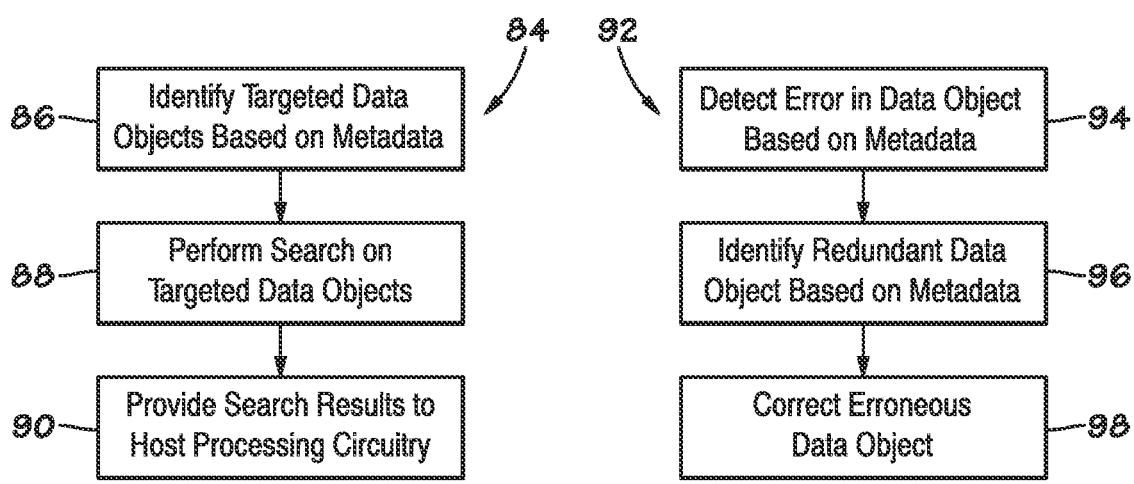
FIG. 8
FIG. 9

MEMORY MODULE DATA OBJECT PROCESSING SYSTEMS AND METHODS

CROSS-REFERENCE TO RELATED APPLICATIONS

This application is a divisional of U.S. patent application Ser. No. 17/085,353, which is entitled "MEMORY MODULE DATA OBJECT PROCESSING SYSTEMS AND METHODS," filed on Oct. 30, 2020, which is a divisional of U.S. patent application Ser. No. 16/050,501, which is entitled "MEMORY MODULE DATA OBJECT PROCESSING SYSTEMS AND METHODS," filed on Jul. 31, 2018, which is a divisional of U.S. patent application Ser. No. 15/908,184, which is entitled "MEMORY MODULE DATA OBJECT PROCESSING SYSTEMS AND METHODS," filed Feb. 28, 2018, and incorporated by reference herein in its entirety for all purposes.

BACKGROUND

The present disclosure generally relates to memory devices and, more particularly, to memory modules (e.g., sub-systems) implemented with dedicated processing circuitry, as well as memory devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a computing system includes processing circuitry (e.g., one or more processors) and memory devices (e.g., chips or integrated circuits). Often, one or more memory devices may be implemented on a memory module, such as a dual in-line memory module (DIMM), to store data accessible to the processing circuitry. For example, based on a user input to the computing system, the processing circuitry may request and a memory module may retrieve corresponding data from its memory devices. In some instances, the retrieved data may include instructions executable by the processing circuitry to perform an operation and/or data to be input to the operation. Additionally, in some instances, data output (e.g., resulting) from the operation may be stored in memory, for example, to enable subsequent retrieval.

In any case, at least in some instances, multiple operations may be targeted for performance by the processing circuitry, for example, over the same or overlapping time periods. As such, processing power (e.g., capabilities) of the processing circuitry may be allocated (e.g., shared or divided) between performance of the various operations. Even as processing power continues to increase, at least in some instances, centralizing processing in the main processing circuitry of a computing system may limit operational efficiency of the computing system, for example, with respect to latency of operation performance.

BRIEF DESCRIPTION OF THE DRAWINGS

Various aspects of this disclosure may be better understood upon reading the following detailed description and upon reference to the drawings in which:

FIG. 1 is a block diagram of a computing system that includes client devices and one or more remote computing devices, in accordance with an embodiment;

FIG. 2 is a block diagram of a memory module that may be implemented in a remote computing device of FIG. 1, in accordance with an embodiment;

FIG. 6 is a flow diagram of a process for operating the memory module of FIG. 2 to store a data object, in accordance with an embodiment;

FIG. 7 is a flow diagram of a process for operating the memory module of FIG. 2 to retrieve a stored data object, in accordance with an embodiment;

FIG. 8 is a flow diagram of a process for operating the memory module of FIG. 2 to search stored data objects, in accordance with an embodiment; and FIG. 9 is a flow diagram of a process for operating the computing system of FIG. 1 to correct a data error occurring in the memory module of FIG. 2, in accordance with an embodiment.

DETAILED DESCRIPTION

Figure 3:
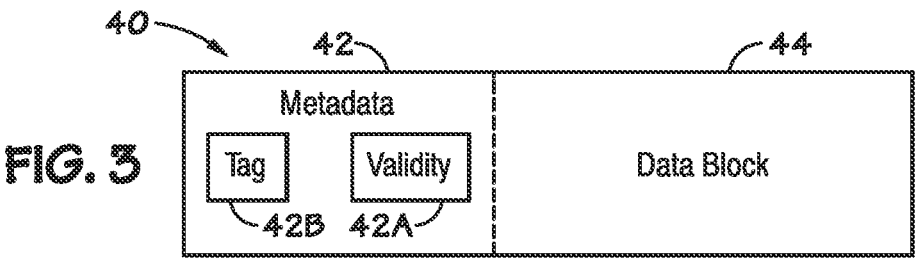
FIG. 3 is a diagrammatic representation of a data object that may be stored in the memory module of FIG. 2, in accordance with an embodiment.

Generally, hardware of a computing system includes processing circuitry and memory, for example, implemented using one or more processors and/or one or more memory devices (e.g., chips or integrated circuits). During operation of the computing system, the processing circuitry may perform various operations (e.g., tasks) by executing corresponding instructions, for example, based on a user input to determine output data by performing operations on input data. To facilitate operation of the computing system, data accessible to the processing circuitry may be stored in a memory device, such that the memory device stores the input data, the output data, data indicating the executable instructions, or any combination thereof.

In some instances, multiple memory devices may be implemented on a memory module, thereby enabling the memory devices to be communicatively coupled to the processing circuitry as a unit. For example, a dual in-line memory module (DIMM) may include a printed circuit board (PCB) and multiple memory devices. In particular, the memory devices may each be disposed on a flat or planar (e.g., front or back) surface of the printed circuit board and selectively coupled to data (e.g., external) pins formed along an (e.g., bottom) edge of the printed circuit board.

In any case, computing system hardware utilization by a single user generally varies over time. Thus, in some instances, hardware resources to be used by multiple users may be centralized and shared to facilitate reducing implementation associated cost, for example, by reducing total component count, reducing total physical footprint (e.g., size), and/or improving scalability compared to multiple discrete computing systems. In some embodiments, the hardware resources may be centralized in one or more remote (e.g., host) computing devices that include host (e.g., main) processing circuitry and host memory modules.

Additionally, in some embodiments, one or more client devices may be communicatively coupled to the remote computing devices via a communication network. In other words, the communication network may enable data communication therebetween and, thus, the client devices to utilize hardware resources provided in the remote computing devices. For example, when a client device receives a user input, the client device may communicate the user input to a remote computing device via the communication network. Based at least in part on the user input, host processing circuitry in the remote computing device may perform one or more operations by executing corresponding instructions, for example, retrieved from a host memory module. Additionally, results of the one or more operations may be communicated back to the client device via the communication network, for example, to enable presentation to a user via display of a graphical user interface (GUI) at the client device.

When multiple client devices are communicatively coupled to the remote computing devices, each client device may utilize hardware resources provided by the remote computing devices in a similar manner. In fact, at least in some instances, this may result in the host processing circuitry being requested to perform multiple different operations, for example, over the same and/or overlapping time periods (e.g., clock cycles). As such, total processing power of the host processing circuitry may be allocated (e.g., divided) between the various operations. At least in some instances, this may result in the remote computing devices allocating less of the host circuitry processing power to an operation than would otherwise be allocated, thereby increasing likelihood of the host processing circuitry limiting operational efficiency (e.g., latency or duration between user input and result return) of the computing system.

Accordingly, to facilitate improving operational efficiency of computing systems, the present disclosure provides tools and techniques for implementing and/or operating memory modules, which, in addition to memory devices, include dedicated (e.g., memory) processing circuitry. In some embodiments, a memory module may include memory processing circuitry in its memory controller. However, beyond merely controlling data access (e.g., storage and/or retrieval), the memory processing circuitry may be implemented to perform data processing operations, for example, which would otherwise be performed by host processing circuitry. For example, the memory processing circuitry may pre-process data being retrieved to the host processing circuitry and/or post-process data received from the host processing circuitry for storage, thereby enabling processing performed by the host processing circuitry to be reduced and, thus, freeing the host processing circuitry for other tasks.

To facilitate processing by memory processing circuitry, related data may be grouped into data blocks, for example, based at least in part on processing interrelationships. As an illustrative example, image data corresponding with video content may be grouped as a first data block. As a further example, data used to provide a client device a virtual machine may be grouped as a second data block. In a similar manner, other types of related data may be additionally or alternatively be grouped into data blocks.

Since data processing is generally data dependent, to facilitate processing by memory processing circuitry, data may be stored as a data object, which, in addition to a data block, includes metadata that provides context for the data block. In some embodiments, a data object may include tag metadata that indicates type and/or other identifying parameters of data included in its data block. For example, a first data object may include first tag metadata, which indicates that its (e.g., first) data block includes image data and/or that its data block corresponds with specific video content. Additionally or alternatively, a second data object may include second tag metadata, which indicates that its (e.g., second) data block includes virtual machine data and/or that its data block corresponds with a specific client device. Furthermore, in some embodiments, a data object may include validity metadata, for example, which may be indicative of whether its data block is valid or contains errors. Metadata may thus include tag metadata and validity metadata, which may be referred to as a first portion and a second portion of the metadata, respectively.

In some embodiments, data objects may be determined (e.g., generated) by processing circuitry, for example, included in host processing circuitry, memory processing circuitry, or both. In any case, to facilitate generating a data object, the processing circuitry may analyze data to group related data into a data block and determine context of the data block, which may be indicated via metadata. To generate the corresponding data object, the metadata and the data block may be associated or grouped together, for example, by concatenating the metadata in front of the data block to facilitate storage as a unit.

As described above, storing data as data objects may facilitate improving operational efficiency of a computing system by enabling a memory module implemented in the computing system to perform data processing operations, for example, to offload processing performed by host processing circuitry. In particular, memory processing circuitry implemented in the memory module may access (e.g., receive, read, or retrieve) a data object, which includes a data block and metadata. Based at least in part on the metadata, the memory processing circuitry may determine context of the data block and perform data processing operations accordingly.

In some embodiments, memory processing circuitry may access data objects and perform corresponding data processing operations based at least in part on communication with host processing circuitry. For example, when a memory access request is received from host processing circuitry, a memory module may retrieve data identified by the memory access request (e.g., via a virtual memory address) from its memory devices. When the retrieved data is a data object, memory processing circuitry in the memory module may read metadata included in the data object and, in some embodiments, pre-process the associated data block accordingly. For example, when the metadata indicates that the data block includes image data, the memory processing circuitry may decode (e.g., decompress) the image data before outputting the data object to the host processing circuitry.

On the other hand, when data for storage is received from host processing circuitry, a memory module may determine whether the data is a data object. In some embodiments, memory processing circuitry in the memory module may determine whether data is a data object based at least in part on whether metadata is included and/or what metadata is included, for example, by reading a specific bit position expected to be allocated for metadata in data objects. In any case, when the received data is a data object, the memory module may read the metadata included in the data object and, in some embodiments, post-process the associated data block accordingly. For example, when the metadata indicates that the data block includes image data, the memory processing circuitry may encode (e.g., compress) the image data before storing the data object in a memory device.

In other words, in some embodiments, memory processing circuitry in a memory module may automatically perform data processing (e.g., pre-processing and/or post-processing) operations during communication with host processing circuitry. In fact, this may enable the host processing circuitry to operate agnostic to processing performed by the memory module, for example, by communicating in the same manner regardless of whether the memory modules include memory processing circuitry. Moreover, by automatically encoding before storage and decoding before output, the memory processing circuitry may facilitate improving data storage efficiency provided by the memory module, for example, without increasing processing performed by the host processing circuitry.

In some embodiments, memory processing circuitry may perform data processing operations based on explicit instructions received from host processing circuitry. In fact, in some embodiments, formatting data in data objects may enable the host processing circuitry to instruct the memory processing circuitry using higher level instructions. For example, instead of specifying its associated memory address, the host processing circuitry may instruct a memory module to return virtual machine data corresponding with a particular client device. By searching tag metadata included in stored data objects, the memory processing circuitry may identify the requested data object, which includes virtual machine data corresponding with the particular client device, for output back to the host processing circuitry.

In fact, in some embodiments, implementing memory processing circuitry in a memory module to perform data search operations may facilitate further improving operational efficiency, for example, by leveraging internal data communication efficiency. Often, compared with external data communication (e.g., between memory module and host processing circuitry), internal data communication (e.g., between memory device and memory processing circuitry) provides faster data communication speed and/or utilizes less electrical power, for example, due to shorter data communication distances, fewer clock synchronizations, and/or higher internal data communication bandwidth. Additionally, data search operations generally involve retrieving data from memory devices and parsing the retrieved data to identify data that meets (e.g., satisfies) one or more search criteria (e.g., rules). As such, performing data search operations and/or other data intensive operations via the memory processing circuitry may facilitate improving operational efficiency by reducing the amount of external data communication, for example, between the memory module and the host processing circuitry.

Moreover, in some embodiments, memory processing circuitry implemented in a memory module may autonomously perform data processing operations, for example, without receiving a trigger (e.g., instruction) from host processing circuitry. In fact, in some embodiments, the memory processing circuitry may opportunistically perform data processing operations, for example, while the host processing circuitry is performing other tasks. As an illustrative example, based at least in part on validity metadata included in a data object, the memory processing circuitry may periodically detect whether an error occurs in a corresponding data block.

To facilitate improving operational reliability, in some embodiments, a computing system may store redundant copies of data. Thus, when an error is detected, the memory processing circuitry may identify a redundant data object via its tag metadata and correct the error using the redundant data object, for example, by overwriting at least erroneous (e.g., invalid) portions of the data object with corresponding portions of the redundant data object. In fact, at least in some instances, detecting and correcting data errors in this manner may facilitate improving data storage efficiency, for example, by enabling a reduction in number of redundant copies stored since errors may be detected via validity metadata and a redundant copy may be identified via tag metadata. Moreover, in some embodiments, error detection and/or error correction may be additionally or alternatively performed using a dedicated (e.g., separate) service processor, for example, to enable error detection and/or error correction when the computing system has otherwise lost power or is otherwise faulty.

In other words, as will be described in more detail below, implementing and/or operating computing systems in accordance with the techniques described in the present disclosure may provide various technical benefits, such as improved operational reliability. Additionally, the techniques described in the present disclosure may facilitate improving data storage efficiency of computing systems, for example, by facilitating storage of encoded (e.g., compressed) data and/or enabling a reduction in number of redundant copies stored. Moreover, the techniques described in the present disclosure may facilitate improving operational efficiency of computing systems, for example, by enabling processing performed by and/or communication with host processing circuitry to be reduced.

To help illustrate, an example of a computing system 10, which includes one or more remote computing devices 11, is shown in FIG. 1. As in the depicted embodiment, the remote computing devices 11 may be communicatively coupled to one or more client device 12 via a communication network 14. It should be appreciated that the depicted embodiment is merely intended to be illustrative and not limiting. For example, in other embodiments, the remote computing devices 11 may be communicatively coupled to a single client device 12 or more than two client devices 12.

In any case, the communication network 14 may enable data communication between the client devices 12 and the remote computing devices 11. In some embodiments, the client devices 12 may be physically remote (e.g., separate) from the remote computing devices 11, for example, such that the remote computing devices 11 are located at a centralized data center. Thus, in some embodiments the communication network 14 may be a wide area network (WAN), such as the Internet, or it may be or include a local area network (LAN) or wireless LAN (WLAN). In any case, to facilitate communication via the communication network 14, the remote computing devices 11 and the client devices 12 may each include a network interface 16.

In addition to the network interface 16, a client device 12 may include input devices 18 and/or an electronic display 20, which enable a user to interact with the client device 12. For example, the input devices 18 may receive user inputs and, thus, may include buttons, keyboards, mice, trackpads, and/or the like. Additionally or alternatively, the electronic display 20 may include touch sensing components that receive user inputs by detecting occurrence and/or position of an object touching its screen (e.g., surface of the electronic display 20). In addition to enabling user inputs, the electronic display 20 may facilitate providing visual representations of information by displaying a graphical user interface (GUI) of an operating system, an application interface, text, a still image, video content, or the like.

As described above, the communication network 14 may enable data communication between the remote computing devices 11 and one or more client devices 12. In other words, the communication network 14 may enable user inputs to be communicated from a client device 12 to a remote computing device 11. Additionally or alternatively, the communication network 14 may enable results of operations performed by the remote computing device 11 based on the user inputs to be communicated back to the client device 12, for example, as image data to be displayed on its electronic display 20.

In fact, in some embodiments, data communication provided by the communication network 14 may be leveraged to enable centralizing hardware available to multiple users, for example, such that hardware at client devices 12 may be reduced. As an illustrative example, the remote computing devices 11 may provide data storage for multiple different client devices 12, thereby enabling data storage (e.g., memory) provided locally at the client devices 12 to be reduced. Additionally or alternatively, the remote computing devices 11 may provide processing for multiple different client device 12, thereby enabling processing power provided locally at the client devices 12 to be reduced.

Thus, in addition to the network interface 16, the remote computing devices 11 may include host processing circuitry 22 and one or more memory modules 24 (e.g., sub-systems) communicatively coupled via a system bus 25. In some embodiments, the host processing circuitry 22 and/or the memory modules 24 may be implemented across multiple remote computing devices 11, for example, such that a first remote computing device 11 includes a portion of the host processing circuitry 22 and the first memory module 24A while an Mth remote computing device 11 includes another portion of the host processing circuitry 22 and the Mth memory module 24M. Additionally or alternatively, the host processing circuitry 22 and the memory modules 24 may be implemented in a single remote computing device 11.

In any case, the host processing circuitry 22 may execute instructions to perform corresponding operations, for example, indicated by user inputs received from a client device 12. Thus, the host processing circuitry 22 may include one or more central processing units (CPUs), one or more graphics processing units (GPUs), one or more processor cores, or any combination thereof. In some embodiments, the host processing circuitry 22 may additionally perform operations based on circuit connections formed (e.g., programmed) in the host processing circuitry 22. Thus, in such embodiments, the host processing circuitry 22 may additionally include one or more application specific integrated circuits (ASICs), one or more field programmable logic arrays (FPGAs), or both. The host processing circuitry 22 may be or include a system on a chip (SoC).

Additionally, a memory module 24 may provide data storage accessible to the host processing circuitry 22. For example, a memory module 24 may store data received from a client device 12, data resulting from an operation performed by the host processing circuitry 22, data to be input to the operation, instructions executable by the host processing circuitry 22 to perform the operation, or any combination thereof. To facilitate providing data storage, a memory module 24 may include one or more memory devices 26 (e.g., chips or integrated circuits). In other words, the memory devices 26 may each be a tangible, non-transitory, computer-readable medium that stores data accessible to the host processing circuitry 22.

To facilitate improving operational reliability, in some embodiments, the remote computing devices 11 may include a service processor 27 communicatively coupled to one or more memory modules 24 via a service bus 28. In other words, in such embodiments, data stored in memory devices 26 of a memory module 24 may be accessible to the service processor 27, for example, which may enable the service processor 27 to perform error detection operations and/or error correction operations. Moreover, as in the depicted embodiment, the service processor 27 may be separate (e.g., distinct) from the host processing circuitry 22 and the service bus 28 may be separate (e.g., distinct) from the system bus 25, for example, to enable the service processor 27 to access stored data even when the remote computing devices 11 have otherwise lost power and/or are otherwise faulty.

In any case, as described above, the remote computing devices 11 may access a memory module 24 during operation, for example, to write (e.g., store) data to its memory devices 26 and/or to read (e.g., retrieve) stored data from its memory devices 26. Accordingly, at least in some instances, operational efficiency of the remote computing devices 11 and, thus, the computing system 10 may be dependent on memory access efficiency (e.g., read latency and/or write latency). To facilitate improving memory access efficiency, in some embodiments, a memory module 24 may control data storage in its memory devices 26, for example, via a memory controller.

To help illustrate, an example of a memory module 24, which includes a memory controller 30 and one or more memory devices 26, is shown in FIG. 2. In some embodiments, the memory controller 30 may operate based on circuit connections formed (e.g., programmed) in the memory controller 30. Thus, in such embodiments, the memory controller 30 may include one or more application specific integrated circuits (ASICs), one or more field programmable logic arrays (FPGAs), or both.

As described above, in some embodiments, memory modules 24 may be communicatively coupled to host processing circuitry 22 via a system bus 25 and/or to a service processor 27 via a service bus 28. To facilitate communication via a data bus (e.g., system bus 25 and/or service bus 28), the memory module 24 may include a bus interface 36. For example, the bus interface 36 may include data pins (e.g., contacts) formed along an (e.g., bottom) edge of a printed circuit board (PCB). Additionally, the memory module 24 may be implemented by disposing each of the memory devices 26 on a flat or planar (e.g., front and/or back) surface of the printed circuit board. Thus, in some embodiments, the memory module 24 may be a single in-line memory module (SIMM), a dual in-line memory module (DIMM), or the like.

Additionally, in some embodiments, the bus interface 36 may include logic that enables the memory module 24 to communicate via a communication protocol implemented on a data bus (e.g., system bus 25 and/or service bus 28). For example, the bus interface 36 may control timing of data output from the memory module 24 to the data bus and/or interpret data input to the memory module 24 from the data bus in accordance with the communication protocol. Thus, in some embodiments, the bus interface 36 may be a double data rate fourth-generation (DDR4) interface, a double data rate fifth-generation (DDR5) interface, a peripheral component interconnect express (PCIe) interface, a non-volatile dual in-line memory module (e.g., NVDIMM-P) interface, or the like.

To facilitate providing data storage, the memory devices 26 on the memory module 24 may be implemented as volatile memory, non-volatile memory, or both. In other words, in some embodiments, the memory devices 26 may include one or more volatile memory devices, such a dynamic random-access memory (DRAM) device, a static random-access memory (SRAM) device, or both. Additionally or alternatively, the memory devices 26 may include one or more non-volatile memory devices, such as a flash (e.g., NAND) memory device, a phase-change (e.g., 3D XPoint™) memory device, a ferroelectric random access memory (FeRAM) device, or any combination thereof.

In any case, as described above, the memory controller 30 may control data storage in the memory devices 26 implemented on the memory module 24. For example, the memory controller 30 may control storage location (e.g., which memory device 26 and/or physical memory address) of data in the memory module 24. Additionally, the memory controller 30 may retrieve requested data from its storage location, for example, based at least in part on a virtual memory address received from host processing circuitry 22 and a memory address map that associated the virtual memory address with a corresponding physical memory address. Thus, as in the depicted embodiment, the memory controller 30 may be coupled between the bus interface 36 and the memory devices 26 via one or more internal buses 37, for example, implemented via conductive traces formed on the printed circuit board.

To facilitate improving operational efficiency, a memory module 24 may include memory processing circuitry 38 implemented to perform data processing operations, for example, which may otherwise be performed by host processing circuitry 22. As in the depicted embodiment, the memory processing circuitry 38 may be implemented in the memory controller 30, thereby resulting in the memory controller 30 controlling data storage as well as performing data processing operations. However, it should be appreciated that the depicted embodiment is merely intended to be illustrative and not limiting. In particular, in other embodiments, a memory module 24 may be implemented with memory processing circuitry 38 separate (e.g., distinct) from its memory controller 30, for example, implemented via one or more dedicated application specific integrated circuits (ASICs), one or more dedicated field programmable logic arrays (FPGAs), or both.

In any case, to facilitate performing data processing operations using memory processing circuitry 38, data may be formatted as data objects 40. In some embodiments, different data objects 40 may include different types of data. For example, a first data object 40A may include image data corresponding with video content while a Kth data object 40K includes virtual machine data. Additionally or alternatively, different data objects 40 may include data corresponding with different entities. For example, the first data object 40A may include image data corresponding with first video content while the Kth data object 40K includes image data corresponding with second (e.g., different) video content. As a further example, the first data object 40A may include virtual machine data corresponding with a first client device 12 while the Kth data object 40K includes virtual machine data corresponding with a second (e.g., different) client device 12. Since data processing is generally data dependent, in addition to data, data objects 40 may indicate context of the data to facilitate processing using memory processing circuitry, for example, instead of using host processing circuitry 22.

To help illustrate, an example of a data object 40 is shown in FIG. 3. As in the depicted embodiment, a data object 40 may include metadata 42 concatenated in front of or prepended to a data block 44. It should be appreciated that the depicted embodiment is merely intended to be illustrative and not limiting. For example, in other embodiments, the data block 44 may be concatenated in front of the metadata 42 or otherwise associated. For example, metadata 42 may be appended to or multiplexed with (e.g., interleaved with data of) data block 44. Additionally or alternatively, the data object 40 may include other types of metadata 42.

In any case, in some embodiments, a data block 44 may include related data, for example, that is expected to be processed together. As an illustrative example, the data block 44 may include the image data corresponding with specific video content. As a further example, the data block 44 may include virtual machine data corresponding with a specific client device 12. Other types of related data may similarly be grouped into data blocks 44.

To facilitate processing of a data block 44 using memory processing circuitry 38, corresponding metadata 42 may indicate context of the data block 44. In some embodiments, the metadata 42 may include validity metadata 42A, which is indicative of validity of the data block 44. For example, the validity metadata 42A may include a validity bit, which indicates that the data block 44 is valid when set (e.g., "1" bit) and invalid when not set (e.g., "0" bit). Additionally or alternatively, the validity metadata 42A may facilitate detecting whether the data block 44 is valid and/or correcting the data block 44 when invalid. For example, the validity metadata 42A may include one or more error checking codes, such as an inversion bit, a poison bit, a parity bit, an error-detecting code (EDC), an error-correcting code (ECC), a Bose-Chaudhuri-Hocquenghem (BCH) code, a message authentication code (MAC), a cyclic redundancy check (CRC) code, or any combination thereof. In other words, metadata 42 included in a data object 40 may enable processing circuitry, such as memory processing circuitry 38 and/or a service processor 27, to determine validity of its associated data block 44.

Additionally, in some embodiments, the metadata 42 may include tag metadata 42B, which indicates identifying parameters of the data block 44. For example, the tag metadata 42B may indicate that the data block 44 includes image data and/or that data block 44 corresponds with specific video content. Additionally or alternatively, the tag metadata 42B may indicate that the data block 44 is virtual machine data and/or that the data block 44 corresponds with a specific client device 12. In other words, metadata 42 included in a data object 40 may enable processing circuitry, such as memory processing circuitry 38 and/or a service processor 27, to identify data included in its associated data block 44. In fact, in some embodiments, tag metadata 42B may facilitate correcting a data object 40 indicated as invalid by its validity metadata 42A, for example, by enabling a redundant data object 40 to be identified. Metadata may thus include multiple portions, which may be referred to a first portion and a second portion.

Figure 4:
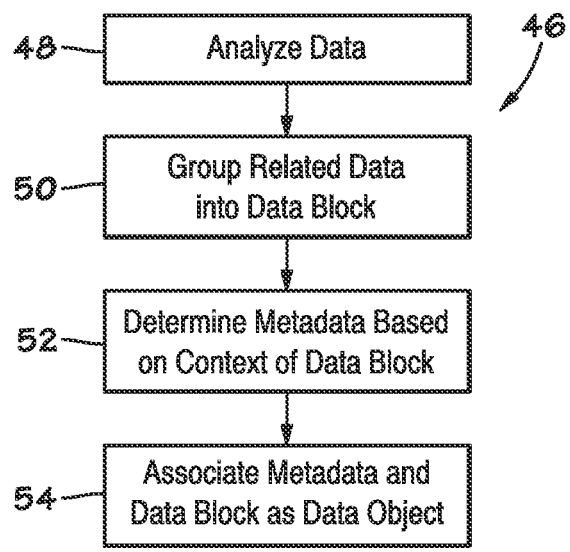
FIG. 4 is a flow diagram of a process for operating the computing system of FIG. 1 to generate the data object of FIG. 3, in accordance with an embodiment.

An example of a process 46 for generating a data object 40 is described in FIG. 4. Generally, the process 46 includes analyzing data (process block 48), grouping related data into a data block (process block 50), determining metadata based on context of the data block (process block 52), and associating the metadata and the data block as a data object (process block 54). In some embodiments, the process 46 may be implemented at least in part by executing instructions stored in a tangible, non-transitory, computer-readable medium, such as a memory device 26, using processing circuitry, such as host processing circuitry 22 and/or memory processing circuitry 38. Additionally or alternatively, the process 46 may be implemented at least in part based on circuit connections formed in the processing circuitry (e.g., host processing circuitry 22 and/or memory processing circuitry 38).

Accordingly, in some embodiments, processing circuitry (e.g., host processing circuitry 22 and/or memory processing circuitry 38) may analyze data to be stored in a memory module 24 (process block 48). For example, the processing circuitry may analyze the data to determine processing interrelationships. Thus, based at least in part on its analysis, the processing circuitry may group related data into a data block 44 (process block 50). For example, the processing circuitry may group data expected to be processed together into a data block 44.

Additionally, based at least in part on its analysis of data included in the data block 44, the processing circuitry may determine context of the data block 44, which may be indicated using metadata 42 (process block 52). For example, the processing circuitry may analyze the data block 44 to determine identifying parameters, such as type of data included in the data block 44 and/or entity associated with the data block 44, and indicate the identifying parameters via tag metadata 42B. Additionally or alternatively, the processing circuitry may analyze the data block 44 by performing one or more cryptographic hash operations (e.g., functions) on the data block 44 to determine corresponding error checking codes, such as a BCH code and/or a CRC code, and indicate the error checking codes via validity metadata 42A.

To produce a corresponding data object 40, the processing circuitry may associate the metadata 42 and the data block 44 (process block 54). In some embodiments, the processing circuitry may associate the metadata 42 and the data block 44 by concatenating the metadata 42 with the data block 44. To facilitate identifying the metadata 42 from the data block 44, in some embodiments, different data blocks 44 may be formatted such that each includes specific bit positions reserved for metadata 42, for example, even when they include different types of metadata 42 and/or different types of data blocks 44.

In any case, after the data object 40 is produced, the processing circuitry may output the data object 40 for storage in a memory device 26 implemented on the memory module 24. For example, when produced by host processing circuitry 22, the host processing circuitry 22 may communicate the data object 40 to the memory module 24 via the system bus 25 and the memory module 24 may store the data object 40 in one or more of its memory devices 26. When produced by memory processing circuitry 38, a memory controller 30 of the memory module 24 may output the data object 40 via the internal bus 37 for storage in one or more of the memory devices 26. In any case, as described above, storing data as data blocks 44 in a memory module 24 may enable the memory module 24 to perform data processing operations via its memory processing circuitry 38, which, at least in some instances, may facilitate improving operational efficiency of computing systems 10.

Figure 5:
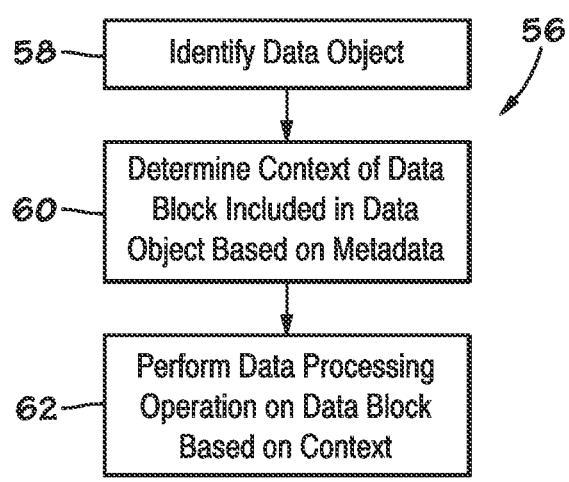
FIG. 5 is a flow diagram of a process for operating the memory module of FIG. 2, in accordance with an embodiment.

To help illustrate, an example of a process 56 for operating a memory module 24 is described in FIG. 5. Generally, the process 56 includes identifying a data object (process block 58), determining context of a data block included in the data object based on metadata (process block 60), and performing a data processing operation on the data block based on its context (process block 62). In some embodiments, the process 56 may be implemented at least in part by executing instructions stored in a tangible, non-transitory, computer-readable medium, such as a memory device 26, using processing circuitry, such as a memory controller 30 and/or memory processing circuitry 38. Additionally or alternatively, the process 56 may be implemented at least in part based on circuit connections formed in a memory controller 30 and/or memory processing circuitry 38.

Accordingly, in some embodiments, a memory controller 30 implemented in a memory module 24 may identify a data object 40, for example, from data stored in the memory module 24, data retrieved from a memory device 26 implemented in the memory module 24, and/or data received from host processing circuitry 22 for storage in the memory module 24 (process block 58). In other words, when it receives data (e.g., for storage and/or from a memory device 26), the memory controller 30 may determine whether the data includes one or more data objects 40. Additionally or alternatively, the memory controller 30 may search data stored in the memory module 24 to identify one or more data objects 40.

In some embodiments, the memory controller 30 distinguishes a data object 40 from data generally based at least in part on whether metadata 42 is included. To facilitate identifying metadata 42, in some embodiments, specific bit positions (e.g., 256 most significant bits) may be reserved for metadata 42 in each data object 40. Accordingly, in such embodiments, the memory controller 30 may parse the specific bit positions in a section of data to determine whether metadata 42 is included and, thus, whether the section of data is formatted as a data object 40.

Additionally or alternatively, the memory controller 30 may receive an indication (e.g., control signal) of whether specific data is included in a data object 40. For example, when the host processing circuitry 22 outputs data for storage, the host processing circuitry 22 may output a control signal along with the data that indicates whether the data is included in a data object 40. Similarly, when host processing circuitry 22 requests access to stored data, the host processing circuitry 22 may output a control signal along with the memory access request that indicates whether the requested data is included in a data object 40.

In any case, when a data object 40 is identified, the memory controller 30 may determine context of data included in a data block 44 of the data object 40 based at least in part on associated metadata 42 (process block 60). As described above, metadata 42 associated with a data block 44 in a data object 40 may indicate context of data included in the data block 44 and, in some embodiments, may be indicated at specific bit positions in the data object 40. To facilitate properly interpreting the metadata 42, in some embodiments, specific bit positions in the metadata 42 may be reserved (e.g., allocated) for specific types of metadata 42.

For example, in the metadata 42, bit position 0 to bit position N may be reserved for tag metadata 42B and bit position N+1 to the most significant bit position may be reserved for validity metadata 42A. Moreover, the bit positions reserved for tag metadata 42B may further divided between tag metadata 42B that indicates type of data included in a corresponding data block 44 and tag metadata 42B that indicates entity associated with the corresponding data block 44. Additionally or alternatively, the bit positions reserved for validity metadata 42A may be further divided between different types of error checking codes. In any case, by parsing the corresponding reserved bit positions in the data object 40, the memory controller 30 may determine what metadata 42 is included and, thus, context (e.g., identifying parameters and/or error checking codes) of the data block 44.

Based at least in part on its context, memory processing circuitry 38 implemented in the memory module 24 may perform data processing operations on the data block 44 (process block 62). For example, based at least in part on validity metadata 42A, the memory processing circuitry 38 may detect and/or correct errors occurring in the data block 44. Additionally, based at least in part on tag metadata 42B, one or more data objects 40 that each includes a targeted type of data may be identified, thereby enabling the memory processing circuitry 38 to perform a data search operation on the identified data objects 40. Furthermore, based at least in part on tag metadata 42B that indicates type of data included in the data block 44, the memory processing circuitry 38 may pre-process data before output to the host processing circuitry 22 and/or post-process data received from the host processing circuitry 22 for storage, which may facilitate freeing the host processing circuitry 22 for other tasks.

In this manner, the memory processing circuitry 38 is able to perform data dependent processing, which, at least in some instances, may facilitate improving operational efficiency, operational reliability, and/or data storage efficiency of computing systems 10. Since data processing is generally data dependent, the specific data processing operations performed by memory processing circuitry 38 may vary based on data included in data objects 40. Moreover, as described above, the techniques described in the present disclosure may be applied to various different types of data, for example, ranging from virtual machine data to image data corresponding with video content. To help illustrate the wide applicability, example use cases enabled by the techniques present herein are described in FIGS. 6-9.

In particular, an example of a process 64 for operating a memory module 24 to post-process data is described in FIG. 6. Generally, the process 64 includes receiving a data object from host processing circuitry (process block 66), determining that the data block includes image data based on metadata (process block 68), compressing the data block (process block 70), and storing the metadata and compressed data block in a memory device (process block 72). In some embodiments, the process 64 may be implemented at least in part by executing instructions stored in a tangible, non-transitory, computer-readable medium, such as a memory device 26, using processing circuitry, such as a memory controller 30 and/or memory processing circuitry 38. Additionally or alternatively, the process 64 may be implemented at least in part based on circuit connections formed in a memory controller 30 and/or memory processing circuitry 38.

Accordingly, in some embodiments, a memory controller 30 that controls data storage in a memory module 24 may receive via a system bus 25 a data object 40 for storage in the memory module 24, for example, from host processing circuitry 22 and/or a network interface 16 (process block 66). As described above, a data object 40 may include a data block 44 and metadata 42, which indicates context (e.g., type of data) of the data block 44. Thus, based at least in part on its metadata 42, the memory controller 30 may determine whether the received data block 44 includes image data.

To facilitate improving storage efficiency while enabling the host processing circuitry 22 to process decoded (e.g., de-compressed) image data, memory processing circuitry 38 implemented in the memory module 24 may perform a data compression (e.g., encoding) operation on the data block 44 (process block 70) before the memory controller 30 stores the data object 40 in one or more memory devices 26 of the memory module 24 (process block 72). In some embodiments, the memory processing circuitry 38 may prediction encode the image data included in the data block 44 using inter-prediction techniques and/or intra-prediction techniques, for example, in accordance with Advanced Video Coding (AVC) and/or High Efficiency Video Coding (HEVC). Additionally or alternatively, the memory processing circuitry 38 may entropy encode the image data included in the data block 44, for example, using context-adaptive binary arithmetic coding (CABAC) and/or context-adaptive variable-length coding (CAVLC). In any case, by compressing its image data, size of the compressed data block 44 may be reduced, for example, compared to the received (e.g., un-compressed) data block 44.

In this manner, memory processing circuitry 38 implemented in a memory module 24 may post-process data by performing data processing (e.g., encoding or compression) operations on the data before storage, which, at least in some instances, may facilitate offloading processing performed by host processing circuitry 22 and, thus, improving operational efficiency of a corresponding computing system 10. To facilitate subsequent retrieval, in some embodiments, the memory controller 30 may update a memory address mapping with the physical memory address at which the data object 40 is stored, for example, such that the physical memory address is associated with a virtual memory address referenced by host processing circuitry 22. Additionally, in some embodiments, the memory controller 30 may update data access parameters (e.g., a write time parameter, a last accessed parameter, and/or an access count parameter) associated with the data object 40. As will be described in more detail below, data access parameters may be analyzed to predict when a data object 40 will be subsequently requested, thereby enabling memory processing circuitry 38 to preemptively pre-process the data object 40, which, at least in some instances, may facilitate further improving operational efficiency of the corresponding computing system 10.

To help illustrate, an example of a process 74 for operating a memory module 24 to pre-process data is described in FIG. 7. Generally, the process 74 includes retrieving a data object from a memory device (process block 76), determining that a data block includes image data based on metadata (process block 78), de-compressing the data block (process block 80), and outputting the metadata and de-compressed data block to host processing circuitry (process block 82). In some embodiments, the process 74 may be implemented at least in part by executing instructions stored in a tangible, non-transitory, computer-readable medium, such as a memory device 26, using processing circuitry, such as a memory controller 30 and/or memory processing circuitry 38. Additionally or alternatively, the process 74 may be implemented at least in part based on circuit connections formed in a memory controller 30 and/or memory processing circuitry 38.

Accordingly, in some embodiments, a memory controller 30 may retrieve a data object 40 from a memory device 26 implemented on a memory module 24 (process block 76). In some embodiments, the memory controller 30 may retrieve the data object 40 from the memory device 26 when the memory module 24 receives a memory access request, for example, from host processing circuitry 22 and/or a network interface 16 that identifies the data object 40 via its virtual memory address. In such embodiments, the memory controller 30 may determine actual storage location of the target data object 40 in the memory module 24, for example, using a memory address mapping that associates the virtual memory address to its physical memory address.

Additionally or alternatively, the memory controller 30 may preemptively retrieve the data object 40, for example, before access to the data object 40 is actually requested. Since data access patterns are often somewhat repetitive (e.g., cyclical), in some embodiments, the memory controller 30 may analyze data access parameters corresponding with one or more data blocks 44 to determine previous data access patterns and predict future data access patterns based at least in part on the previous data access patterns, for example, using machine learning techniques. In this manner, the memory controller 30 may predict when the data object 40 will actually be requested and retrieve the data object 40 at least a processing duration beforehand. Since data processing is generally data dependent and duration used to perform different data processing operations may vary, in some embodiments, the memory controller 30 may predictively set the processing duration based on various factors, such as processing duration of previously performed data processing operations, size of the predicted data block 44, type of data indicated by corresponding metadata 42 as being included in the predicted data block 44, and/or the like.

In any case, as described above, a data object 40 may include a data block 44 and metadata 42, which indicates context (e.g., type of data) of the data block 44. Thus, based at least in part on its metadata 42, the memory controller 30 may determine whether the retrieved data block 44 includes image data. As described above, in some embodiments, image data may be compressed before storage to facilitate improving data storage efficiency provided by a memory module 24. However, host processing circuitry 22 may expect to process de-compressed image data.

Thus, to facilitate improving storage efficiency while enabling the host processing circuitry 22 to process decoded (e.g., de-compressed) image data, the memory processing circuitry 38 may perform a data de-compression (e.g., decoding) operation on the data block 44 (process block 80) before the memory controller 30 outputs the data object 40. Generally, data de-compression operations may be the opposite (e.g. inverse or reverse) of data compression operations. In other words, in some embodiments, the memory processing circuitry 38 may entropy decode the image data included in the data block 44, for example, using CABAC decoding and/or CAVLC decoding. Additionally or alternatively, the memory processing circuitry 38 may decode (e.g., reconstruct) the image data included in the data block 44 by reversing the inter-prediction techniques and/or intra-prediction techniques, for example, in accordance with Advanced Video Coding (AVC) and/or High Efficiency Video Coding (HEVC). In any case, after the data object is actually requested and its data block 44 is de-compressed, the memory module 24 output the data object 40 via a system bus 25, for example, to the host processing circuitry 22 and/or the network interface 16 to enable further processing without first performing a de-compression (e.g., decoding) process.

In this manner, memory processing circuitry 38 implemented in a memory module 24 may pre-process data by performing data processing (e.g., decoding and/or de-compression) operations on the data before output, which, at least in some instances, may facilitate offloading processing performed by host processing circuitry 22 and, thus, improving operational efficiency of a corresponding computing system 10. In addition to offloading (e.g., reducing) processing performed by host processing circuitry 22, the techniques of the present disclosure may facilitate improving operational efficiency by leveraging data communication efficiency provided by internal buses 37 implemented on a memory module 24. In particular, data communication efficiency (e.g., power consumption, speed, and/or bandwidth) provided by an internal bus 37 is generally better than data communication efficiency provided by an external bus, such as a system bus 25 coupled between the memory module 24 and the host processing circuitry 22. Thus, reducing data communication on the system bus 25 may facilitate improving operational efficiency—particularly for data intensive operations.

To help illustrate, an example of a process 84 for operating a memory module 24 to perform a data intensive (e.g., search) operation is described in FIG. 8. Generally, the process 84 includes identifying targeted data objects based on metadata (process block 86), performing a data search operation on the targeted data objects (process block 88), and providing search results to host processing circuitry (process block 90). In some embodiments, the process 84 may be implemented at least in part by executing instructions stored in a tangible, non-transitory, computer-readable medium, such as a memory device 26, using processing circuitry, such as a memory controller 30 and/or memory processing circuitry 38. Additionally or alternatively, the process 84 may be implemented at least in part based on circuit connections formed in a memory controller 30 and/or memory processing circuitry 38.

Accordingly, in some embodiments, a memory controller 30 implemented on a memory module 24 may identify one or more data objects 40 targeted for a data search operation based at least in part on corresponding metadata 42 (process block 86). In some embodiments, the data search operation may be initiated based on an explicit instruction received from host processing circuitry 22, for example, when the host processing circuitry 22 receives a corresponding user input that requests performance of one or more data processing operations including the data search operation. Additionally or alternatively, the memory module 24 may autonomously initiate the data search operation, for example, based at least in part on a prediction that performance of the data search operation will subsequently be requested.

As described above, in some embodiments, a memory controller 30 may analyze data access parameters to determine previous data access patterns and predict future operation accordingly, for example, using machine learning techniques. In this manner, the memory controller 30 may predict when performance of the data search operation and/or results of the data search will subsequently be requested and autonomously initiate the data search operation at least a processing (e.g., expected search) duration beforehand. Since search duration is generally dependent on amount of data searched (e.g., non-deterministic), in some embodiments, the memory controller 30 may predictively set the processing duration based on various factors, such as search duration of previously performed data search operations, certainty that the data search operation will actually be requested, amount of data stored in the memory module 24, number of data objects 40 stored in the memory module 24, size of each data object 40, and/or the like.

In any case, data targeted for identification by a data search operation often occurs within a specific one or more types of data. For example, the result of a data search operation targeting a picture is generally found in image data. Additionally, the result of a data search operation targeting an executable instruction is generally found at least in virtual machine data.

Since search duration is generally dependent on amount of data searched, in some embodiments, the memory controller 30 may facilitate improving search efficiency by narrowing the data search operation to one or more types of data in which targeted data is expected to be found. As described above, in some embodiments, metadata 42 included in a data object 40 may indicate type of data included in a corresponding data block 44. Thus, by parsing metadata 42 of data objects 40 stored in memory devices 26, the memory controller 30 may identify and, thus, retrieve one or more data objects 40 that each includes at least one of the targeted types of data, for example, into an internal buffer of the memory controller 30.

Memory processing circuitry 38 may then perform the data search operation by searching the data objects 40 targeted by the data search operation (process block 88). In some embodiments, the memory processing circuitry 38 search for the targeted data by parsing the data block 44 of each of the targeted data objects 40. In particular, to facilitate identifying the targeted data, the memory processing circuitry 38 may search the data block 44 based at least in part on one or more search criteria (e.g., rules) associated with the data search operation.

After actually requested, the memory controller 30 may output results of the data search operation via a system bus 25, for example, to host processing circuitry 22 and/or a network interface 16 (process block 90). When targeted data is actually found, the results of the data search operation may identify and/or include one or more data objects 40, which each includes the targeted data object. On the other hand, when the targeted data is not found, the results of the data search operation may indicate that the targeted data object is not stored in the memory module 24 and/or that allotted search duration has expired before the targeted data could be found. In any case, size of the data search operation results is generally less than total size of the targeted data objects 40—let alone total size of all the data objects 40 stored in the memory module 24.

In other words, although the same data objects 40 may be retrieved from the memory devices 26 and, thus, communicated via internal buses 37 regardless of where a data search operation is performed, using memory processing circuitry 38 to perform the data search operation may facilitate reducing number of data objects 40 output via an external bus, such as a system bus 25. In this manner, performing data search operations and/or other data intensive operations using memory processing circuitry 38 implemented in a memory module 24 may facilitate reducing amount of external communication, which, at least in some instances, may facilitate leveraging communication efficiency provided by its internal buses 37 to improve operational efficiency of a corresponding computing system 10. In addition to improving operational efficiency, the techniques described in the present disclosure may facilitate improving operational reliability of computing systems 10.

To help illustrate, an example of a process 92 for operating a computing system 10 is described in FIG. 9. Generally, the process 92 includes detecting an error in a data object based on metadata (process block 94), identifying a redundant data object based on metadata (process block 96), and correcting the erroneous data object (process block 98). In some embodiments, the process 92 may be implemented at least in part based on circuit connections formed in memory processing circuitry 38. Additionally or alternatively, the process 92 may be implemented at least in part by executing instructions stored in a tangible, non-transitory, computer-readable medium, such as a memory device 26, using processing circuitry, such as memory processing circuitry 38 and/or a service processor 27.

Accordingly, in some embodiments, processing circuitry (e.g., memory processing circuitry 38 and/or a service processor 27) may detect whether an error has occurred in a data object 40 based at least in part on its metadata 42 (process block 94). In some embodiments, memory processing circuitry 38 implemented in a memory module 24 may autonomously initiate the error detecting process. For example, the memory processing circuitry 38 may opportunistically initiate the error detecting process when the memory processing circuitry 38 predicts that the memory module 24 will not receive requests within a threshold duration. Additionally or alternatively, the error detecting process may be initiated externally. For example, a service processor 27 may initiate the error detecting process when it detects that at least a portion of a corresponding computing system 10 has lost power and/or is otherwise faulty.

In any case, as described above, metadata 42 of a data object 40 may include validity metadata 42A, which is indicative of whether a corresponding data block 44 is valid (e.g., does not contain errors). For example, when the validity metadata 42A includes a validity bit, the processing circuitry may determine that the data block 44 is valid when the validity bit is set (e.g., a "1") and invalid when the validity bit is not set (e.g., "0" bit). Additionally or alternatively, when the validity metadata 42A includes an error checking code, the processing circuitry may perform a cryptographic hash operation on the data block 44 and determine whether the data block 44 is valid based at least in part on whether the result of the cryptographic hash operation matches the error checking code.

When an invalid data object 40 is detected, the processing circuitry may identify a redundant data object 40 based at least in part on metadata 42 of the invalid data object 40 and/or metadata 42 of the redundant data object 40 (process block 96). As described above, metadata 42 of a data object 40 may include tag metadata 42B that indicates identifying parameters of a corresponding data block 44. Thus, in some embodiments, the processing circuitry may identify a data object 40 as the redundant data object 40 when its tag metadata 42B indicates the same identifying parameters as the tag metadata 42B of the invalid data object 40, for example, such that both include the same type of data and are associated with the same entity. Additionally or alternatively, metadata 42 included in a data object 40 may explicitly indicate a corresponding redundant data object 40.

In any case, when an invalid data object 40 is detected, the processing circuitry may correct the invalid data object 40 (process block 98). To correct an error, in some embodiments, the processing circuitry may perform an error correcting process on the invalid data object 40 and/or the redundant data object 40, for example, based at least in part on an error-correcting code (ECC) included in metadata 42. Additionally or alternatively, when the processing circuitry determines that the redundant data object 40 is valid (e.g., based on its validity metadata 42A), the processing circuitry may correct the error by overwriting at least the data block 44 of the invalid data object 40 with the data block 44 of the redundant data object 40. In any case, by correcting errors in this manner, likelihood of a memory module 24 outputting an invalid data object 40 may be reduced, which, at least in some instances, may facilitate improving operational reliability of a corresponding computing system 10.

By implementing and/or operating a memory module in accordance with the techniques described herein, a memory module may perform data processing operations that facilitate offloading (e.g., reducing) processing performed by main (e.g., host) processing circuitry of a computing system. For example, dedicated (e.g., memory) processing circuitry implemented in a memory module may pre-process data before output to the main processing circuitry and/or post-process data received from the main processing circuitry before storage in a memory device of the memory module. With this understanding, the technical effects of the present disclosure include improving operational efficiency, operational reliability, and/or data storage efficiency provided by memory modules and, thus, computing systems in which the memory modules are implemented.

One or more specific embodiments of the present disclosure are described above. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising processing circuitry configured to be communicatively coupled to a memory sub-system, wherein the processing circuitry is configured to:
receive a first data object comprising a first data block and a first tag that identifies the first data block as comprising image data from the memory sub-system via a data bus, wherein the first data block comprises a first copy of first decoded image data determined by the memory sub-system by decoding a first copy of first encoded image data stored in the memory sub-system;
process the first copy of the first decoded image data to determine second decoded image data that facilitates improving perceived image quality when a corresponding image is displayed on an electronic display; and
output the first data object with the first tag and the first data block comprising the second decoded image data to the memory sub-system via the data bus to enable the memory sub-system to store second encoded image data determined by the memory sub-system by encoding the second decoded image data.

2. The apparatus of claim 1, wherein the processing circuitry is configured to:
output a memory access request to the memory sub-system via the data bus that instructs the memory sub-system to perform a search operation based at least in part on a search criteria;
perform a different operation while the memory sub-system is performing the search operation; and
receive the first data object from the memory sub-system in response to the memory access request when the first data object meets the search criteria.

3. The apparatus of claim 1, wherein the processing circuitry is configured to:
output a first memory access request to the memory sub-system via the data bus that indicates a target tag expected to be associated with image data targeted by the processing circuitry to enable the memory sub-system to search tag metadata included in each of a plurality of data objects stored in the memory sub-system based at least in part on the target tag; and
receive the first data object from the memory sub-system in response to the first memory access request when the first tag included in the first data object matches the target tag.

4. The apparatus of claim 3, wherein, when an error is detected in the first data object, the processing circuitry is configured to:
output a second memory access request to the memory sub-system via the data bus that indicates the target tag expected to be associated with the image data targeted by the processing circuitry;
receive a second data object comprising a second data block from the memory sub-system via the data bus in response to the second memory access request, wherein the second data block comprises a second copy of the first decoded image data determined by the memory sub-system by decoding a second copy of the first encoded image data stored in the memory sub-system; and
process the first decoded image data to determine the second decoded image data by overwriting at least a portion of the first copy of the first decoded image data with a corresponding portion of the second copy of the first decoded image data.

5. The apparatus of claim 1, wherein, to process the first copy of the first decoded image data, the processing circuitry is configured to:
determine validity metadata included in the first data object;
perform a cryptographic hash on the first copy of the first decoded image data included in the first data object;
detect that an error is present in the first decoded image data when a result of the cryptographic hash differs from the validity metadata included in the first data object; and
correct the error in the first decoded image data to determine the second decoded image data when the error is detected.

6. The apparatus of claim 1, wherein the memory sub-system is configured to:
receive the first data object with the first tag and the first data block comprising the second decoded image data from the processing circuitry via the data bus;
determine whether the first tag indicates that the first data block comprises image data; and
when the first tag indicates that the first data block comprises image data:
determine the second encoded image data by encoding the second encoded image data included in the first data block; and
store the first data object with the first tag and the first data block comprising the second encoded image data in the memory sub-system.

7. The apparatus of claim 1, wherein the memory sub-system is configured to:
receive a memory access request that requests return of the first data object from the processing circuitry via the data bus; and
in response to the memory access request:
search a plurality of data objects stored in the memory sub-system to identify the first data object;
determine whether the first tag included in the first data object indicates that the first data block of the first data object comprises image data; and
when the first tag indicates that the first data block comprises image data:
determine the first copy of the first decoded image data by decoding the first copy of the first encoded image data included in the first data block; and
output the first data object with the first tag and the first data block comprising the first encoded image data to the processing circuitry via the data bus.

8. A method, comprising:
receiving, via processing circuitry, a first data object comprising a first data block and a first tag that identifies the first data block as comprising image data from a memory sub-system via a data bus, wherein the first data block comprises a first copy of first decoded image data determined by the memory sub-system by decoding a first copy of first encoded image data stored in the memory sub-system;
processing the first copy of the first decoded image data to determine second decoded image data that facilitates improving perceived image quality when a corresponding image is displayed on an electronic display; and
outputting the first data object with the first tag and the first data block comprising the second decoded image data to the memory sub-system via the data bus to enable the memory sub-system to store second encoded image data determined by the memory sub-system by encoding the second decoded image data.

9. The method of claim 8, comprising:
outputting a memory access request to the memory sub-system via the data bus that instructs the memory sub-system to perform a search operation based at least in part on a search criteria;
performing a different operation while the memory sub-system is performing the search operation; and
receiving the first data object from the memory sub-system in response to the memory access request when the first data object meets the search criteria.

10. The method of claim 8, comprising:
outputting a first memory access request to the memory sub-system via the data bus that indicates a target tag expected to be associated with image data targeted by the processing circuitry to enable the memory sub-system to search tag metadata included in each of a plurality of data objects stored in the memory sub-system based at least in part on the target tag; and
receiving the first data object from the memory sub-system in response to the first memory access request when the first tag included in the first data object matches the target tag.

11. The method of claim 10, comprising:
when an error is detected in the first data object:
outputting a second memory access request to the memory sub-system via the data bus that indicates the target tag expected to be associated with the image data targeted by the processing circuitry;
receiving a second data object comprising a second data block from the memory sub-system via the data bus in response to the second memory access request, wherein the second data block comprises a second copy of the first decoded image data determined by the memory sub-system by decoding a second copy of the first encoded image data stored in the memory sub-system; and
processing the first decoded image data to determine the second decoded image data by overwriting at least a portion of the first copy of the first decoded image data with a corresponding portion of the second copy of the first decoded image data.

12. The method of claim 8, comprising:
processing the first copy of the first decoded image data, by:
determining validity metadata included in the first data object;
performing a cryptographic hash on the first copy of the first decoded image data included in the first data object;
detecting that an error is present in the first decoded image data when a result of the cryptographic hash differs from the validity metadata included in the first data object; and
correcting the error in the first decoded image data to determine the second decoded image data when the error is detected.

13. The method of claim 8, comprising:
receiving the first data object with the first tag and the first data block comprising the second decoded image data from the processing circuitry via the data bus;
determining whether the first tag indicates that the first data block comprises image data; and
when the first tag indicates that the first data block comprises image data:
determining the second encoded image data by encoding the second encoded image data included in the first data block; and
storing the first data object with the first tag and the first data block comprising the second encoded image data in the memory sub-system.

14. The method of claim 8, comprising:
receiving a memory access request that requests return of the first data object from the processing circuitry via the data bus; and
in response to the memory access request:
searching a plurality of data objects stored in the memory sub-system to identify the first data object;
determining whether the first tag included in the first data object indicates that the first data block of the first data object comprises image data; and
when the first tag indicates that the first data block comprises image data:
determining the first copy of the first decoded image data by decoding the first copy of the first encoded image data included in the first data block; and
outputting the first data object with the first tag and the first data block comprising the first encoded image data to the processing circuitry via the data bus.

15. A computer system, comprising:
a memory sub-system;
a data bus;
processing circuitry communicatively coupled to the memory sub-system via the data bus, wherein the processing circuitry is configured to:

receive a first data object comprising a first data block and a first tag that identifies the first data block as comprising image data from the memory sub-system via a data bus, wherein the first data block comprises a first copy of first decoded image data determined by the memory sub-system by decoding a first copy of first encoded image data stored in the memory sub-system;

process the first copy of the first decoded image data to determine second decoded image data that facilitates improving perceived image quality when a corresponding image is displayed on an electronic display; and output the first data object with the first tag and the first data block comprising the second decoded image data to the memory sub-system via the data bus to enable the memory sub-system to store second encoded image data determined by the memory sub-system by encoding the second decoded image data.

16. The computer system of claim 15, wherein the processing circuitry is configured to:

output a memory access request to the memory sub-system via the data bus that instructs the memory sub-system to perform a search operation based at least in part on a search criteria;

perform a different operation while the memory sub-system is performing the search operation; and receive the first data object from the memory sub-system in response to the memory access request when the first data object meets the search criteria.

17. The computer system of claim 15, wherein the processing circuitry is configured to:

output a first memory access request to the memory sub-system via the data bus that indicates a target tag expected to be associated with image data targeted by the processing circuitry to enable the memory sub-system to search tag metadata included in each of a plurality of data objects stored in the memory sub-system based at least in part on the target tag; and receive the first data object from the memory sub-system in response to the first memory access request when the first tag included in the first data object matches the target tag.

18. The computer system of claim 15, wherein, to process the first copy of the first decoded image data, the processing circuitry is configured to:

determine validity metadata included in the first data object;

perform a cryptographic hash on the first copy of the first decoded image data included in the first data object;

detect that an error is present in the first decoded image data when a result of the cryptographic hash differs from the validity metadata included in the first data object; and correct the error in the first decoded image data to determine the second decoded image data when the error is detected.

19. The computer system of claim 15, wherein the memory sub-system is configured to:

receive the first data object with the first tag and the first data block comprising the second decoded image data from the processing circuitry via the data bus;

determine whether the first tag indicates that the first data block comprises image data; and when the first tag indicates that the first data block comprises image data:

determine the second encoded image data by encoding the second encoded image data included in the first data block; and store the first data object with the first tag and the first data block comprising the second encoded image data in the memory sub-system.

20. The computer system of claim 15, wherein the memory sub-system is configured to:

receive a memory access request that requests return of the first data object from the processing circuitry via the data bus; and in response to the memory access request:

search a plurality of data objects stored in the memory sub-system to identify the first data object;

determine whether the first tag included in the first data object indicates that the first data block of the first data object comprises image data; and when the first tag indicates that the first data block comprises image data:

determine the first copy of the first decoded image data by decoding the first copy of the first encoded image data included in the first data block; and output the first data object with the first tag and the first data block comprising the first encoded image data to the processing circuitry via the data bus.

* * * * *